US012716246B2

(12) United States Patent
Oosterhof et al.

(10) Patent No.: US 12,716,246 B2
(45) Date of Patent: Aug. 25, 2026

(54) GLUING DEVICE, SYSTEM FOR GLUING BRICK SLIPS AND METHOD THEREFORE

(71) Applicant: Salixinvent B.V., De Wilgen (NL)

(72) Inventors: Erik Oosterhof, DeWilgen (NL); Arjen John Klatter, De Wilgen (NL)

(73) Assignee: SALIXINVENT B.V., De Wilgen (NL)

( * ) Notice: Subject to any disclaimer, the term of this patent is extended or adjusted under 35 U.S.C. 154(b) by 0 days.

(21) Appl. No.: 19/061,629

(22) Filed: Feb. 24, 2025

(65) Prior Publication Data

US 2025/0188752 A1 Jun. 12, 2025

Related U.S. Application Data

(62) Division of application No. 18/005,772, filed as application No. PCT/NL2021/050457 on Jul. 16, 2021, now Pat. No. 12,234,656.

(30) Foreign Application Priority Data

Jul. 17, 2020 (NL) ..................................... 2026088
Oct. 5, 2020 (NL) ..................................... 2026622

(51) Int. Cl.

*B32B 41/00* (2006.01)
*B05C 5/02* (2006.01)
*B05C 11/10* (2006.01)
*E04F 21/02* (2006.01)

(52) U.S. Cl.

CPC .......... *E04F 21/023* (2013.01); *B05C 5/0208* (2013.01); *B05C 5/0254* (2013.01); *B05C 11/1005* (2013.01)

(58) Field of Classification Search

CPC .... E04F 21/023; B05C 5/0208; B05C 5/0254; B05C 11/1005
USPC .................... 156/60, 64, 350, 351, 378, 379
See application file for complete search history.

(56) References Cited

U.S. PATENT DOCUMENTS

| | | | |
|---|---|---|---|
| 2019/0211555 A1 | 7/2019 | Kooistra |
| 2020/0197975 A1 | 6/2020 | Routen |

FOREIGN PATENT DOCUMENTS

| | | |
|---|---|---|
| CN | 101088626 | 12/2007 |
| EP | 3636352 A2 | 4/2020 |
| NL | 1041076 | 8/2016 |

OTHER PUBLICATIONS

Written Opinion of the International Searching Authority, PCT Application No. PCT/NL2021/050457, 7 pages.

*Primary Examiner* — Michael N Orlando
*Assistant Examiner* — Joshel Rivera
(74) *Attorney, Agent, or Firm* — MH2 Technology Law Group, LLP

(57) ABSTRACT

The invention relates to a gluing device, for gluing brick slips, a system for gluing brick slips and a method for gluing brick slips, for example for providing brickwork veneer. The gluing device includes a support, a glue container that extends from a first end to a second end, wherein the glue container is operatively connected to the support, a discharge nozzle that is operatively connected to the first end of the glue container and that is provided with a discharge opening, and a plunger that, during use of the device, is positioned in the glue container and that is provided with a drive side facing the first end of the glue container and a press side facing the second end of the glue container, and wherein the plunger is operatively connected to the support. The plunger and the container are connected to the support and wherein one of the plunger and the container is moveably connected to the support with respect to the other of the plunger and the container, such that the plunger and the container are moveable relative to each other.

17 Claims, 3 Drawing Sheets

GLUING DEVICE, SYSTEM FOR GLUING BRICK SLIPS AND METHOD THEREFORE

The invention relates to a gluing device for gluing brick slips, a system for gluing brick slips and a method for gluing brick slips, for example for providing brickwork veneer.

The practice of gluing brick slips to base surface, for example for providing brickwork veneer, has been known for decades. In the known practice, the gluing involves almost exclusively manual labor of a craftsman. The craftsman applies glue, often cement-based glue, to the base surface and subsequently applies the brick slips or stone slips in a predetermined pattern on the wall. Although this allows virtually any pattern to be made, the known practice also has large drawbacks. A major disadvantage of the known practice is that the process is time-consuming and, therefore, costly.

In order to solve this problem, devices for gluing brick slips were developed. The automated processing allows a larger amount of stone slips to be glued in a shorter period of time. In order to achieve this, these devices apply a layer or continuous line of glue on the entire base surface, after which the brick slips or stone slips are placed in the glue.

A disadvantage of these devices is that, due to the application of glue in a layer or continuous line on the entire base surface, it requires a large amount of glue. This leads to relatively high costs and waste of glue. In addition, it requires the use of paste-based glue, which can be processed for a longer period of time than cement-based glue. This is mainly due to the fact that cement-based glue can only be processed for a (very) limited time period before being too hard for processing.

An objective of the present invention is to provide a brick slip and/or stone slip gluing device for gluing brick slips or stone slips that obviates or at least reduces the aforementioned problems, and specifically to provide a brick slip and/or stone slip gluing device capable of being used with cement-based glue.

This objective is achieved with the brick slip and/or stone slip gluing device according to the invention, the brick slip and/or stone slip gluing device comprising:

- a support;
- a glue container that extends from a first end to a second end, wherein the glue container is operatively and removably connected to the support;
- a discharge nozzle that is operatively connected to the first end of the glue container and that is provided with a discharge opening; and
- a plunger that, during use of the device, is positioned in the glue container and that is provided with a drive side facing the first end of the glue container and a press side facing the second end of the glue container, and wherein the plunger is operatively connected to the support,
- wherein the plunger and the container are connected to the support and wherein one of the plunger and the container is moveably connected to the support with respect to the other of the plunger and the container, such that the plunger and the container are moveable relative to each other.

It is noted that the gluing device according to the invention is meant for gluing brick slips and/or stone slips to a base surface. As such, the application is referred to in the application as gluing device, brick slip gluing device, gluing device for brick slips and/or stone slips, and/or stone slip gluing device, all of which terms are used interchangeably.

It is also noted that the device according to the invention can be used to glue brick slips and/or stone slips to a base surface.

Furthermore, it is noted that brickwork may include stone strips, brick strips, brick slips, and/or stone slips, and that these may be made of ceramics and/or minerals and/or plastic and/or wood and/or metal.

Furthermore, it is also noted that glue may refer to cement-based glue, two component glue, or pasty based glue throughout this application. Therefore, the disclosed effects and advantages of the glue are similar for each type of glue, and may be used interchangeably. It will be understood that pasty based glue and paste-based glue are different types of glue. Furthermore, when advantages for a particular type of glue are mentioned, these advantages are not necessarily also present for other types of glue.

The device according to the invention is specifically mentioned (and adapted) for gluing brick slips and/or stone slips. Contrary to other types of materials, brick slips and/or stone slips are relatively porous materials and require a full surface bonding to prevent fluids, for example water, to penetrate between the slips and the base surface. Fluid penetration will lead, when expanding under low temperatures (such as with frost), to the slips being forced loose from the base surface. This is an unwanted effect that should be prevented. In practice, it is known that such full surface bonding is only achieved using cement-based glue. However, such cement-based glues, due to their rapid hardening, can only be processed a short time.

An advantage of the gluing device according to the invention is that, contrary to the known devices, it can be used in conjunction with cement-based glue, two component glue, and/or pasty based glue. This is contrary to known devices, which are not capable of being used with cement-based glue. As mentioned above, it is known from practice that the use of cement-based glue provides the best results in terms of gluing strength and water resistance when gluing brick strips. Since it is also known from practice that the open time of cement-based glue is relatively (very) short, which means a matter of a few minutes, processing time is short. The open time is known as the time that is required for the top layer of the cement-based glue to harden, thus forming a thin (non-adhesive) layer on the glue that prevents the brick slip from bonding with the glue. Due to the limited open time of cement-based glue, it is required to glue the brick slip almost immediately after applying the glue. In the known devices, which apply a continuous line of glue or apply glue on an entire surface, the open time of the glue has elapsed before applying the brick slip, thus resulting in non-bonding between the brick slips and glue on the base surface. Due to the fact that the gluing device according to the invention applies the glue to the brick slip just before placing (i.e. gluing) the brick slip on the base surface, the gluing takes place well within the open time of the glue.

Another advantage of the device according to the invention is that a removable and thus exchangeable glue container is provided, which allows processing of cement-based glue in the device. During use, the glue container has only a limited time of use, or operational time, before the cement-based glue is hardened to a point at which it becomes non-usable. Due to the application of the removable (thus exchangeable) glue container, the container can be removed after a predetermined use time in which the cement-based glue starts to harden. It can easily be replaced with a different glue container to allow continuous processing. The removed glue container can be discarded or cleaned for re-use.

Another advantage of the device according to the invention is that said device is provided with a discharge nozzle that is positionable directly over a brick slip to be glued. As a result, only the surface of the brick slip that needs to be glued is provided with glue. Preferably, the brick slip to be glued is provided with a layer of glue over the entire surface that is to be glued to the base surface. In an alternative preferred embodiment, the brick slip to be glued is provided with a layer of glue over part of the surface that is to be glued to the base surface, wherein the part of the surface that is to be glued to the base surface is positioned in the middle of said surface. Preferably, the glue covers substantially the entire surface that is to be glued to the base surface when the brick slip is provided to the base surface. This is for example done by pressing the brick slip to the surface to flow the glue out underneath the brick slip. After pressing the brick slip to the surface, the glue will flow out, preferably the glue will flow out from underneath the brick slip. This enables to inspect the formed brickwork to ensure that glue is present over the entire (lower) surface (to be glued) of the brick strip or slip. If needed, the brick slip may be removed from the surface and placed again.

Another advantage of the device according to the invention is that, due to the combination of the plunger and glue container, the amount of glue that is dispensed from the discharge nozzle be adapted to accurately match the required amount of glue for the brick slip to be glued.

A further advantage of the device according to the invention is that, due to providing the glue to the brick slip, the glue may be sealed, for example using a point, after providing the brick slip to be glued provided with a layer of glue to the base surface. The glue may be sealed to be air tight and/or moisture tight and/or water tight. This prevents degradation of the glue and ultimately a reclamation of the brick slip.

Moreover, yet another advantage of the gluing device according to the invention is that it, apart from gluing mineral brick slips, also enables gluing of ceramic brick slips. It is known from practice that gluing ceramic brick slips to a base surfaces requires the need of cement-based glue in order to provide sufficient hold to the base surface. As discussed above, the use of cement-based glue or pasty based glue is possible with the device according to the invention, whereas it can not be used in the known devices. This means that, contrary to the known devices, the device according to the invention can be used to glue both mineral and ceramic brick slips.

It is noted that the glue container of the device according to the invention is provided with an inner space in which the glue to dispense can be positioned. The inner space is formed by at least one side wall of the glue container and extends over a height from the first end to the second end of the glue container. During use, the plunger is positioned in the inner space of the glue container to press, using the press side, glue towards and out of the discharge nozzle. This means that a cross-sectional surface of the glue container in a direction that is perpendicular to a longitudinal axis has a substantially similar shape as the press and drive surfaces of the plunger to provide a substantially snug fit. The glue container of the device according to the invention preferably is cylindrically shaped, with the press and drive surfaces of the plunger having a substantially circular shape. This shape of glue container and plunger allow an efficient dispensing of the glue in the container without having 'dead' corners from which the glue is not dispensed towards the discharge nozzle. However, it is noted that other shapes, including triangular, rectangular or regular polygonal may also be used. During use, the plunger moves towards the discharge nozzle to press glue out of the discharge nozzle. It is noted that moving the plunger towards the discharge nozzle can be performed by moving the plunger with respect to the container (i.e. the container is stationary), or by moving the container with respect to the plunger (i.e. plunger is stationary).

In an embodiment according to the invention, the press side of plunger is operatively connected to the support, whereas the plunger may preferably also be at least partially retractable in or even from (the inner space of) the container.

An advantage of an at least partially retractable plunger is that, especially with cement-based glue, the plunger is useable to start, stop and regulate dispensing of the glue. Cement-based glue has a relatively high viscosity, which means that pressure needs to be applied to dispense it from the discharge opening. As soon as the pressure is released, the flow of cement-based glue from the discharge opening will stop substantially immediately. The retractable plunger can therefore advantageously be released to stop the flow of glue from the discharge opening. This obviates the need for valves and/or other drip-stop systems at or near the discharge opening of the discharge nozzle.

Another advantage of providing a retractable plunger is that, when using pasty-based glue, the glue container can easily be replaced for a replacement glue container, for example when the glue container is empty. This reduces idle time of the gluing device according to the invention and thus reduces costs. In addition, it obviates the need to clean the container and/or the nozzle.

In a preferred embodiment, the discharge nozzle is provided with a valve. Said valve prevents leaking of glue from the glue container.

It is preferred that a discharge opening of the discharge nozzle is positionable over a base to which a brick slip is to be glued.

In an embodiment according to the invention, the plunger and/or the glue container may be provided with a sealing that extends between a side surface of the plunger and an inner side wall of the glue container.

An advantage of providing a sealing, such as a sealing ring in case of a cylindrical glue container, increases pressure on the glue in the glue container when the plunger is moved relative to the glue container towards the discharge nozzle.

Another advantage is that the glue in the glue container is unable, at rising pressure, to escape along the sides of the plunger, between the plunger and the inner side wall of the glue container. As a result, substantially all glue in the glue container is useable for dispensing from the discharge nozzle.

Yet another advantage of providing a sealing is that said sealing obviates cleaning of the glue container. This enables to use the glue container multiple times and reduces the cost to install new glue containers.

In an embodiment according to the invention, the glue container may be moveably connected to the support, and wherein the device may comprise a container lifting mechanism to move the glue container with respect to the plunger.

In this embodiment, the plunger is mounted stationary, and preferably also releasably, on the support, whereas the glue container is moveably mounted to the support to allow the plunger and the container to move relative to each other.

An advantage of this embodiment is that the glue container can, after emptying, easily be discarded and replaced for a new container.

Another advantage is that the glue container and the discharge nozzle can simultaneously be removed to be discarded and/or cleaned for subsequent use.

Simultaneously, the costs for the device are reduced due to the fact that the plunger can be mounted stationary on the support.

In an embodiment according to the invention, the plunger may be moveably connected to the support, and wherein the device may comprise a plunger lifting mechanism that is configured to move the plunger with respect to the container.

An advantage of providing a moveable plunger is that the position of the glue container with respect to the support and a brick slip or stone slip to be glued remains stationary during use of the device. As a result, it is easier to position the brick slips to be glued with respect to the discharge nozzle. In most cases, this will result in the discharge nozzle, by virtue of the stationary glue container, be positioned at a stationary position.

In a preferred embodiment, the plunger or the glue container or both are releasably connected to the support.

An advantage of connecting the plunger and the glue container in a releasable manner to the support is that the plunger and glue container can be dispatched in a single operation without having to retract the plunger from the glue container. This is especially advantageous when using cement-based glue, because cement-based glue hardens relatively quickly. This means that, after a short period of time, the glue container and the plunger are substantially connected to each other by the drying cement-based glue. At that time, the glue container and the plunger are simultaneously removed (with the plunger in the glue container) and a new set of plunger and glue container is connected to the support to continue the gluing operation. This construction reduces downtime of the gluing device.

In an embodiment of the device according to the invention, the device comprises a servo that is operatively connected to the plunger and is configured to press the plunger towards the second end of the glue container.

An advantage of providing a servo to apply pressure on the plunger is that it allows the glue to be dispensed from the discharge opening of the discharge nozzle.

Another advantage is that the servo can be used to measure the quality of the glue, especially cement-based glue, in the glue container. As explained earlier, cement-based glue has a relatively short drying period in which it can be processed. In other words, over time the cement-based glue dries out to the point of hardening and, thus, the point of not being useable any more. By using a servo, the amount of pressure applied to the plunger can be measured and related to the quality of the remaining glue. This is due to the fact that the pressure that needs to be applied increases with increasing hardening of the glue in the glue container. At a predetermined pressure to be applied, the cement-based glue has exceeded a point of hardening at which it is no longer useable (i.e. quality is too low). When this point is reached, the glue, preferably the glue container, is to be replaced.

In an embodiment according to the invention, the plunger lifting mechanism comprises a first arm that extends in a first direction from a support end connected to the support to a remote end, and a second arm that extends in a second direction that is perpendicular to the first direction from a top end that is connected to the remote end of the first arm to a plunger end that is connected to the plunger, wherein the lifting mechanism is moveable along the support in the second direction to move the plunger in the glue container.

An advantage of this embodiment is that the plunger can be moved completely to the first end of the glue container and, in some embodiments, even towards and into the discharge nozzle. This is possible by virtue of the second arm extending in the second direction.

Another advantage of this embodiment is that, due to the rigid nature of the first and second arm, the press side of the plunger can be operated with sufficient force to press the glue to be dispensed from the discharge nozzle.

In an embodiment according to the invention, wherein the device further may comprise a detection module that is positioned near or adjacent to the discharge nozzle.

An advantage of the detection module is that it allows the amount and/or distribution of the glue on the surface of the brick slip or stone slip to be assessed after the glue has been applied by the discharge nozzle. It alternatively or additionally also allows a thickness of the applied layer to be assessed. As such, it provides a direct quality assessment that allows immediate correction before the brick slip or stone slip is glued onto the base surface. In case insufficient glue is applied and/or the distribution of the glue over the surface is incorrect, the brick slip can be discarded without it being glued onto the base surface. A reliable, high-quality brickwork veneer can therewith be delivered with the gluing device according to the invention.

Moreover, especially in combination with a processing system and/or software, the detected layer can be assessed on amount, distribution and/or thickness of the glue layer against a predetermined set point. This is most advantageous with regard to a predetermined layer thickness set point. In most countries, the point between brick slips must comply with a prescribed depth, which relates to the thickness of the glue layer to obtain sufficient bonding of the point. Such prescribed depths are in most cases provided by the supplier of the pointing substance. In other words, an advantage of the detection module is that it can be directly assessed whether the sum of the glue layer and the brick slip thickness meets the required set point of (required) point thickness. Therewith, it can be guaranteed that the supplier requirements for the pointing substance are met for each brick slip or stone slip that is glued onto the base surface.

Another advantage of the detection module is that the glue, if not correctly applied, can be removed from the brick slip immediately after application thereof. This allows the brick slip to be reused in the brickwork veneer, rather than having to discard the brick slip. This is possible due to the fact that the detection takes place immediately after applying the glue, which means that the glue is still soft and can be easily removed, for example with a scraping device. As a result, production of waste materials is reduced and less new material is required.

In an embodiment according to the invention, the detection module is configured to create a three-dimensional image of the brick-slip or stone-slip.

An advantage of creating a three-dimensional image, especially when the detection module, when viewed in a movement direction of the brick slips, is positioned before the discharge nozzle, is that the amount of glue can be adapted, by the control unit, to the shape of the brick slip or stone slip to be glued. This allows a highly precise dispensing of the glue onto the brick slip or stone slip.

An advantage of creating a three-dimensional image, especially when the detection module, when viewed in a movement direction of the brick slips, is positioned after the discharge nozzle, is that the distribution of glue over the surface to be glued can be measured in high detail. This is performed by creating, by the detection module, a three-dimensional image of the brick slip or stone slip, especially the edges thereof that are glued to the base surface, and subsequently determining, by the control unit, whether sufficient glue has flown out underneath the brick slip or stone slip during placement. This determining may for example be performed by comparing the amount of glue with a set point, which may be a height, a width, a surface or any other suitable variable that is detected by the detection module.

In an embodiment according to the invention, a volume of a glue container is adapted to a workpiece to be glued.

An advantage of having a glue container of which the volume is adapted to the workpiece to be glued is that decay, for example by hardening, of the glue is prevented. This allows a more efficient gluing process, because the glue is discharged in accordance with the work piece and no glue is wasted.

In an embodiment according to the invention, the control unit is configured to, based on a time reference point, determine an operational time of a glue container and to prevent discharge of glue after a predetermined operational time period has been lapsed.

An advantage of this embodiment is that the use of glue after a predetermined time period is prevented. Especially with cement-based glue, the glue hardens after a short period of time. This means that each glue container can only be used for a predetermined, and mostly limited, time period before the glue in the container is at least partially hardened and no longer suitable for use. The control unit is configured to measure the replacement time of a glue container, such that the use of non-suitable glue is substantially prevented. It is noted that the mentioned time period can be adapted for different types of glue.

In an embodiment according to the invention, the control unit is configured to, preferably based on information of the dectection module, to calculate a required amount of glue for a full surface covering of the brick slip and/or stone slip to be glued.

This embodiment has the advantage that the amount of glue is calculated based on actual, real-time measurement of the surface as detected by the detection module. The actual measurement made by the detection module allows errors or changes in the position or surface of the brick slip or stone slips to be glued to be corrected by adjusting the relative positioning of the discharge nozzle and the brick slip or stone slip to be glued. This embodiment may be used alternatively or in addition to an embodiment in which the layout of the slips on the base surface are determined by making an image or map of the positions. This allows that the position of the discharge nozzle is firstly based on the image or map and, if necessary, corrected by the control unit based on the measurement by the detection module.

In an embodiment according to the invention, a distance between the detection module and an opening of the discharge nozzle is in the range of less less than 0.3 meter, preferably less than 0.2 meter.

An advantage of providing a distance between the detection module and the opening of the discharge nozzle in the abovementioned range is that it allows an accurate measurement, while still providing sufficient distance to allow the brick slip of stone slip to be moved along the discharge opening of the discharge nozzle.

In an embodiment according to the invention, the detection module may comprise a camera, a sensor, a laser, an infra-red beam, or a combination thereof.

The detection module may comprise a number and/or combination of different technologies, although a camera, a sensor, a laser, or an infra-red beam are preferred. These technologies may easily be combined with a processor and/or processing software to provide detailed information on for example the thickness of the glue layer that is applied and/or the distribution of the glue over the brick slip or stone slip surface. This allows a high quality, piece-per-piece control system that guarantees that each brick slip or stone slip complies with the standards. It is noted that the sensor may be a camera, a laser, and/or an infra-red beam.

In an embodiment according to the invention, the glue container may be removably connected to the support, and preferably wherein the glue container may be an exchangeable glue container, and wherein the plunger is preferably removably connected to the support, wherein the plunger and the glue container preferably form an exchangeable unit.

An advantage of this embodiment is that the glue container may, after being substantially completely emptied, easily be replaced with a filled glue container. This reduces idle time of the device compared to a device in which the glue container needs to be refilled.

Another advantage of the exchangeable glue container is that, due to its exchangeable nature, fouling by old glue can be substantially prevented. In other words, a replacement glue container is assured to have a high quality glue that is unpolluted by glue remains of a previous batch. It is preferred that the glue container and the plunger are exchangeable as a single unit. In other words, the plunger is not removed from the glue container during the exchange, but is removed with the old glue container. This increases switching speed and reduces the risk of fouling even further.

Yet another advantage is that the glue containers can be easily cleaned after removal, which allows reuse of the containers after cleaning and refilling. This reduces the environmental footprint of the device and simultaneously reduces operational costs of the device.

A further advantage of an exchangeable glue container (and preferably plunger) is that the glue can be provided in predetermined batches to the device. This means that each glue container can be provided with the required amount of glue for a specific gluing job. As a result, the amount of residual glue, and therewith the use of base glue materials, is reduced.

In an embodiment according to the invention, the exchangeable glue container is replaced after a predetermined time period.

Due to the fact that cement-based glue glue, and/or pasty based glue has a relatively short drying time, for example less than 24 minutes, the decay in quality of the glue can be calculated over time. By exchanging the glue container at specific time intervals, which corresponds with the decay curves, the use of low-quality glue can be substantially prevented.

In an embodiment according to the invention, the plunger and/or the glue container may comprise an air release channel.

An advantage of an air release channel is that any air in the inner space between the press side of the plunger and the discharge nozzle can be expelled before the gluing device is used for gluing brick slips. In order to provide a high quality glue layer on the brick slip or stone slip, the glue in the glue container should preferably not contain any residual air that was captured upon installation of the glue container and plunger. Any air that was inadvertently captured during (re-)installation of the glue container can be expelled from the inner space by virtue of the air release channel. This allows the inner space to contain substantially only glue, thus preventing air bubbles or irregularities in the glue layer provided to the brick slip.

In an embodiment according to the invention, the device may further comprise a control unit, wherein the control unit may be configured to control the relative movement between the plunger and the glue container to dispense a predetermined amount of glue through the discharge nozzle.

It is preferred that the gluing device comprises a control unit, for example a control unit including a processor or a computing device, to allow a high degree of automated operation. The control unit may primarily be used to control the dispensing of the glue from the discharge nozzle through the discharge opening by controlling the relative movement between the plunger and the glue container. An advantage of the control unit is that it is capable of providing a high degree of control over the amount of glue that is dispensed. In addition, the control unit is capable of providing a high degree of control over the shape in which the glue is dispensed. This enables the use of different shaped stone slips/brick slips.

Preferably, the control unit is operatively coupled with the sensor. An advantage of the coupling between the sensor and the control unit is that the real time information may be provided to the gluing device according to the invention. In other words, a closed-loop is achieved.

In an embodiment according to the invention, the control unit may additionally be configured to control the relative movement between the plunger and the glue container based on measurement data from the detection module.

An advantage of this embodiment is that it introduces a corrective regulator into the gluing device by adapting the dispensed amount of glue per brick slip to the measured layer thickness, amount and/or layer distribution on a brick slip on which a layer was applied. In use, the detection module provides to the control unit measurements on one or more of the layer thickness, layer distribution and/or the amount of glue dispensed, which allows the control unit to directly adapt the relative movement between plunger and glue container. By adapting the total relative movement per brick slip, the (total) amount of glue to be dispensed is regulated. Likewise, the duration of the dispensing, in other words, the amount per time unit dispensed, may be regulated by the control unit based on the measurements from the detection module. This has a result on the thickness and distribution of the glue layer on the brick slip.

In an embodiment according to the invention, the gluing device may comprise a notification module, for example an visible and/or audible alarm, and wherein the control unit may be configured to receive measurement data from the detection module comprising a dispensed amount of glue that is dispensed to a brick slip to be glued, compare the dispended amount of glue with a set point including a predetermined amount of glue to be dispensed, and, based on the comparison, control the notification module to provide a notification when the detected amount of glue differs from the set point.

Alternatively or additionally, the device may comprise a notification unit that provides direct feedback to an operator and/or the control unit with regard to the quality of the output. An advantage thereof is that the device according to the invention is not only capable of self-correction in terms of the glue layer, but also provides feedback on that correctness (i.e. the meeting of the predetermined standards that were provided as set point) to the operator. Therewith, the operator, for example using a log book and/or a digital log in a computing device, may register and/or correct the settings in the control unit to (further) improve the performance of the device according to the invention.

Another advantage is that, in the event of a reclamation, the log book provides direct and detailed information on a batch of brick slips that was glued using the device according to the invention. This provides unambiguous evidence of the status of the glued brick slips upon gluing.

In an embodiment according to the invention, a discharge opening of the discharge nozzle is an elongated slit-like shaped discharge opening.

An advantage of an elongated slit-like opening is that the length of the opening (measured in the elongated direction) may be adapted to the width of a brick slip to be glued. This would allow an even layer of glue to be applied in a single move of the brick slip passed the discharge opening. Therewith, the chance of errors due to overlapping glue layers is obviated.

Another advantage of an elongated slit-like opening is that it allows complete surface gluing of a brick slip or stone slip. The slit-like shape provides an even layer of glue, preferably cement-based glue, over substantially the entire width and substantially the entire length of the surface of the brick-slip or stone-slip to be glued (to the base surface). This means that, when placed upon the base surface, the brick slip or stone slip is glued with its complete surface to the base surface, therewith ensuring a strong, water-proof connection.

In an embodiment according to the invention, the discharge nozzle may be removably connected to the glue container, and preferably is a replaceable and/or exchangeable discharge nozzle.

An advantage of providing a replaceable or exchangeable discharge nozzle is that the device can be easily outfitted to glue different sizes, shapes and/or widths of brick slips or stone slips to be glued by providing discharge nozzles with a different slit width and/or length.

Another advantage is that, if the discharge nozzle may reach the end-of-life, it can be replaced without the need to replaced the glue container as well. Conversely, upon replacement of the glue container, the discharge nozzle may be maintained. This reduces the environmental footprint of the device and also reduces operational costs of the device.

In an embodiment according to the invention, the glue container and/or the plunger may comprise a level sensor that is configured to measure a level of glue remaining in the glue container.

Several different variants of this embodiment may be devised. It may for example comprise one or more level sensors that are applied at one or different heights in the glue container to measure the descend of the plunger, and thus of the quantity of glue remaining in the glue container. In another example, a level sensor may be provided in the plunger. In yet another example, a level sensor may be provided in both the glue container and the plunger, such that the distance between the two sensors may be used to determine the amount of glue left in the glue container. In an even further, and preferred, example, the level sensor is formed by a servo that is configured to press the plunger towards the second end of the glue container. The position of the plunger can advantageously be established by registering the servo configurations before and after moving the plunger over a predetermined distance towards the second end. With this configuration, the risk of fouling of the level sensor is substantially obviated, thus providing an accurate measurement over a longer period of time.

Preferably, the one or more level sensors are connected to the control unit, to allow the control unit to control the switching of the glue containers when these are substantially emptied.

In an embodiment of the device according to the invention, the device is configured to be used with cement-based glue, and the cement-based glue is preferably used for gluing mineral and/or ceramic brick slips.

An advantage of the gluing device according to the invention is that it can be used in conjunction with cement-based glue, which is not possible in the known devices. It is known from practice that the use of cement-based glue provides the best results in terms of gluing strength and water resistance when gluing brick strips. It is however also known that the open time of cement-based glue is relatively (very) short, which means a matter of only a few minutes. The open time is known as the time that is required for the top layer of the cement-based glue to harden, thus forming a thin (non-adhesive) layer on the glue that prevents the brick slip from bonding with the glue. Due to the limited open time of cement-based glue, it is required to glue the brick slip almost immediately after applying the glue. As the known devices apply a continuous line of glue or even apply glue on an entire surface before applying the brick slips, the time between the application of the glue and the placing of the brick slips is longer than the open time of the glue. This results in non-bonding between the brick slips and glue on the base surface. Due to the fact that the gluing device according to the invention applies the glue to the brick slip just before placing (i.e. gluing) the brick slip on the base surface, the gluing takes place well within the open time of the glue.

Yet another advantage of the gluing device according to the invention is that it, due to the use of cement-based glue, also enables gluing of ceramic brick slips. It is known from practice that gluing ceramic brick slips to a base surfaces requires the need of cement-based glue in order to provide sufficient hold to the base surface. As discussed above, the use of cement-based glue is possible with the device according to the invention, which means that, contrary to the known devices, the device according to the invention can be used to glue both mineral and ceramic brick slips.

In an embodiment according to the device, the device is operatively coupled with a pointing device. Preferably, the pointing device comprises:

- a support that is configured for supporting a product comprising brickwork;
- a filling nozzle;
- a pointing substance container that is operatively coupled with the filling nozzle, wherein the pointing substance container is configured for holding a pointing substance;
- movement means that are configured to position the filling nozzle relative to the support;
- a control unit configured for:
  - controlling the movement means; and
  - determining the amount of pointing substance in relation to a point;
- a sensor that is operatively connected to the control unit, and is configured for sensing the location and size of the point; and
- orientation means that are configured to establish a relative position between the filling nozzle and the support.

The invention also relates to a system for gluing brick slips and/or stone slips for brickwork veneer, the system comprising:

- an input;
- an output; and
- at least one gluing device according to any one of the preceding claims that is positioned between the input and the output.

The system according to the invention provides similar advantages and effects as the gluing device according to the invention. Moreover, the embodiments described above may freely be combined in the system according to the invention.

An advantage of the system according to the invention is that it provides a highly reliable, automated system for gluing brick slips on a base material.

Another advantage of the system according to the invention is that it is highly efficient in terms of the amount of glue that is used. This is mainly due to the fact that the gluing device according to the invention, allows glue to be placed on each brick slip separately. This obviates the need to apply glue on the entire base surface.

The system may freely be expanded with other optional features as known to the skilled person. The invention also relates to a method for providing brick slips on a base surface, the method comprising the steps of:

- providing a gluing device according to the invention or a system to the invention;
- providing a number of brick slips to be glued;
- positioning a surface of a brick slip to be glued underneath the discharge nozzle;
- discharging glue on the surface; and
- gluing the brick slip to a base surface.

The method according to the invention has similar advantages and effects as the device and the system according to the invention. Moreover, the embodiments described above for the system and the device according to the invention may freely be combined in the method according to the invention.

The method according to the invention provides an efficient and effective method to glue a wide variety of different patterns of brick slips on a base surface. This is mainly due to the fact that each brick slip is individually provided with glue and subsequently glued on the base surface. As a result, especially when using measurement means and/or a detection module, a high quality brickwork veneer can be achieved with the brick slips at a relatively high speed.

Another advantage of the method according to the invention is that a plurality of brick slips and/or stone slips can be glued simultaneously.

In an embodiment of the method according the invention, the method additionally may comprise the steps of, after the step of discharging glue on the surface, detecting, by the detection module, an amount of glue on the brick slip, comparing, by the control unit, the amount of glue with a set point, and, if the amount of glue meets or exceeds the set point, gluing the brick slip to a base surface, and if the amount of glue does not meet the set point, refurbishing the brick slip by removing the glue from the brick slip.

An advantage of the abovementioned embodiment is that the glue layer on each brick slip is checked prior to the base surface, which increases the overall quality of the brick slipwork as a whole. This also provides a traceable quality system that is useable to provide a guarantee on the brick slipwork.

In an embodiment of the method according the invention, the method additionally may comprise the steps of measuring a surface size and/or thickness and/or shape of a brick slip to be glued, calculating, by the control unit, the amount of glue to be dispensed based on the measured surface size and/or thickness and/or shape of a brick slip to be glued, and dispensing the calculated amount of glue.

An advantage of this embodiment according to the invention is that, by providing measurement up front, the amount and dispensing speed of glue can be calculated to provide a high quality layer in terms of thickness, distribution and/or other characteristics.

Further advantages, features and details of the invention are elucidated on the basis of preferred embodiments thereof, wherein reference is made to the accompanying drawings, in which.

Figure 1:
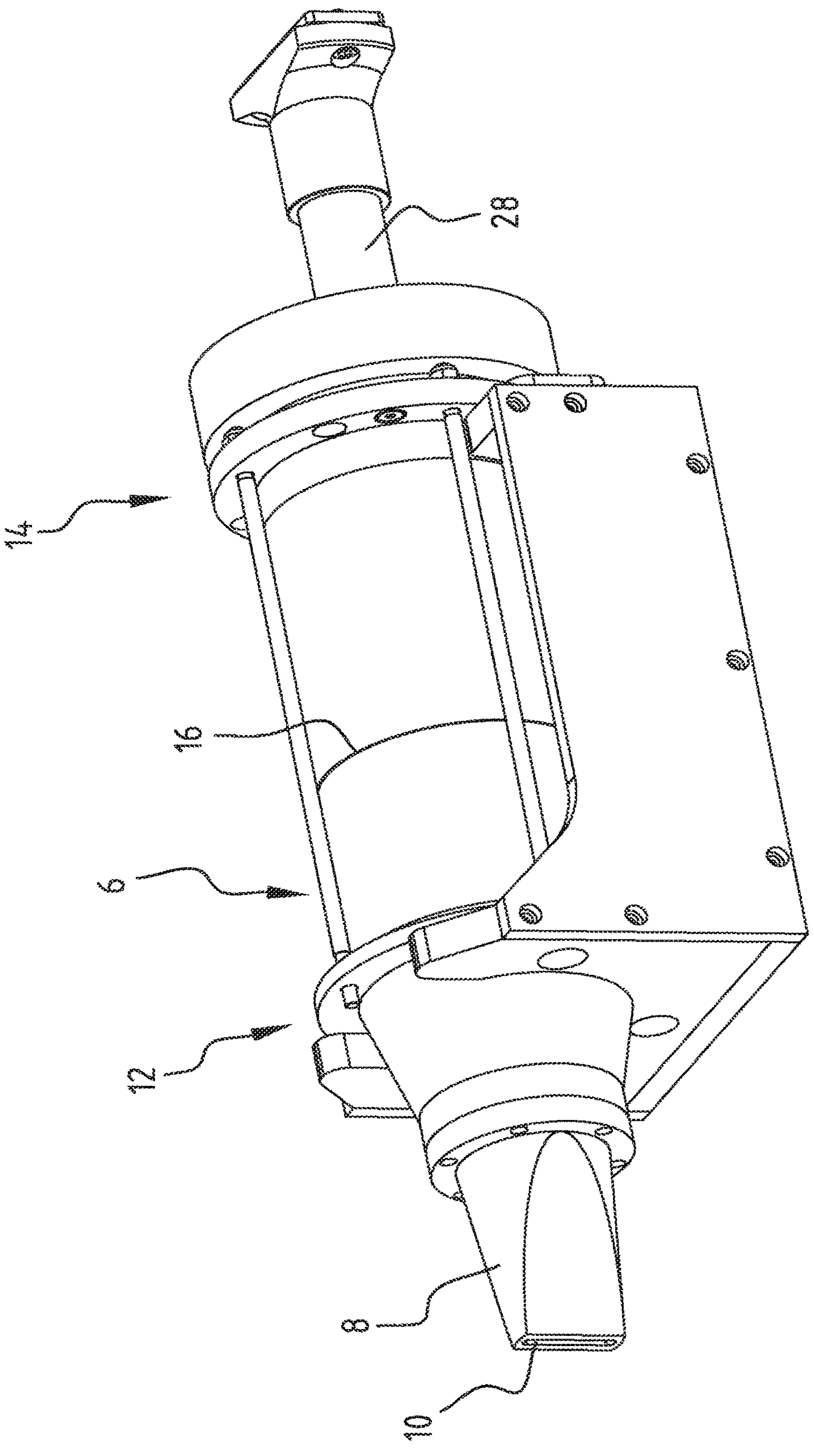
FIG. 1 shows a perspective view of an example of the gluing device according to the invention.
Figure 2:
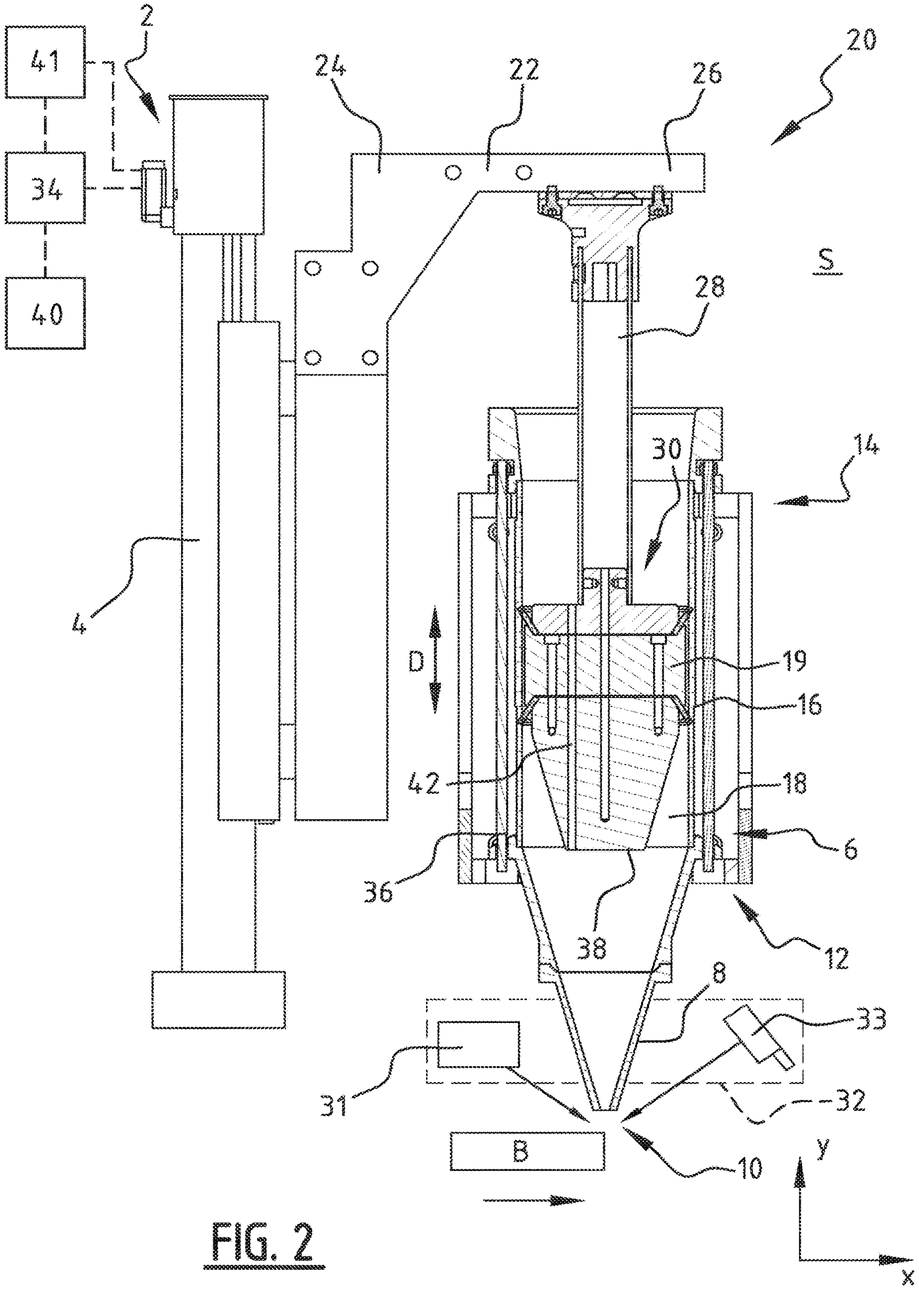
FIG. 2 shows a schematic cross-sectional view of an example of the gluing device of FIG. 1.
Figure 3:
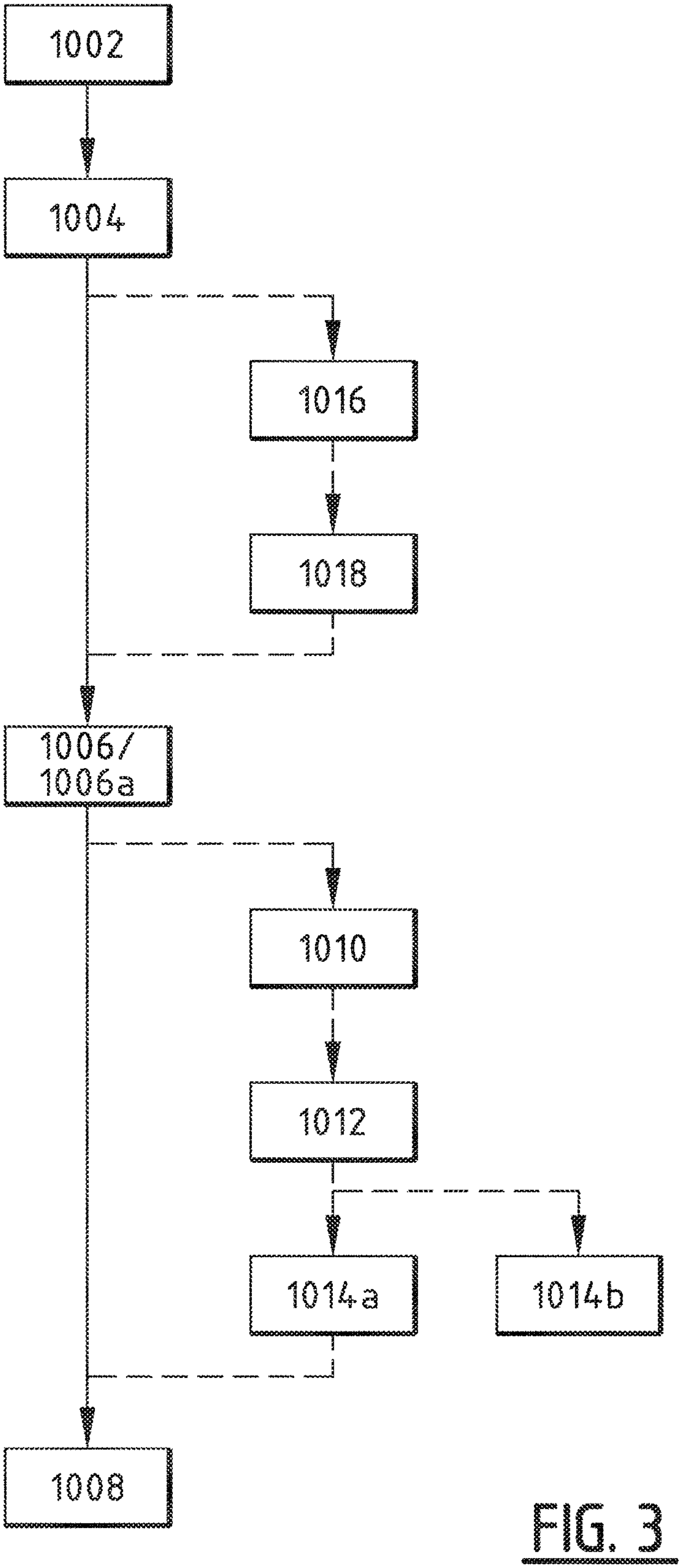
FIG. 3 shows a schematic view of an example of the method according to the invention.

In an example of gluing device 2 according to the invention (see FIGS. 1 and 2), gluing device 2 comprises support 4 to which glue container 6 is connected. In this example, glue container 6 is removably connected to support 4, such that glue container 6 can be exchanged. Glue container 6 in this example comprises a cylindrical container 6 having first end surface that extends vertically upwards in a second direction Y from first end 12 to second end 14. Glue container 6 is further provided with side wall 16, which encloses inner space 18. At first end 12 of glue container 6 discharge nozzle 8 having discharge opening 10 is provided. Gluing device 2 further comprises plunger 19, which is moveably connected to support 2 by means of lifting mechanism 20. Lifting mechanism 20 comprises first arm 22 that extends in first direction X from support end 24 to remote end 26 and second arm 28 that extends in second direction Y from remote end 26 to plunger end 30. Due to lifting mechanism 20 plunger 19 is moveable in second direction Y within glue container 6. Moreover, lower end 19*a* or press side 19*a* of plunger 19, together with side wall 16 and discharge nozzle 8 define inner space 18 in which glue is placeable.

Gluing device 2 further comprises detection module 32, which in this example is a combination of sensor 31 and camera 33. Camera 33 and/or sensor 31 is configured to detect and/or measure presence, thickness and/or distribution of a glue layer on brick slip B when it has been moved passed discharge opening 10 in the first direction x.

Gluing device 2 in this example further also comprises control unit 34 which is operatively connected to lifting mechanism 20 and camera 33 and sensor 31, and optionally to level sensors 36, 38. Using measurement data from camera 33 and/or sensor 31, control unit 34 is able to determine the amount of glue that needs to be dispensed for each consecutive brick slip B or stone slip B. Based on the measurement data, control unit 34 controls lifting mechanism 20 to descent in the second direction Y over a distance D to dispense the required amount of glue from inner space 18.

Level sensors 36, 38, which in this example are respectively placed on glue container 6 and plunger 19, cooperate to provide additional information to control unit 34 on the distance D that is traveled by plunger 19 to indicate the amount of glue dispensed. It is noted that level sensors 36, 38 are not required or essential for gluing device 2 to function. Furthermore, it is noted that the distance D depends on the actual amount of glue to be dispensed, which means the distance D as shown in the figures (see for example FIG. 2) only provides an indication.

Optional level sensors 36, 38 may also be used by control unit 34 to detect whether glue container 6, as most notably inner space 18, is empty (from glue). Control unit 34 may be configured to provide, by using optionally available notification module 40, to an operator that inner space 18 of glue container 6 is empty. In addition, or alternatively, the glue level in glue container 6 is measured using servo 41. Servo 41 relates a start position to control unit 34 before moving lifting mechanism 20 downwards, and after moving lifting mechanism 20 downwards relates an end position to control unit 34, which allows control unit 34 to calculate the displacement and thus the remaining amount of glue. Moreover, servo 41 also provides pressure information to control unit 34, which allows control unit 34 to calculate, by comparing the pressure value with a set point, whether the quality of the glue in glue container 6 is sufficient or needs to be replaced.

Also, gluing device 2 may comprise air release channel 42, which extends from inner space 18 to a connection with surroundings S. This allows air to be removed from inner space 18, such that only glue is contained therein. This prevents stuttering, air bubbles or other irregularities during dispensing of glue from discharge opening 10 of discharge nozzle 8.

In use of gluing device 2, brick slip B is provided towards discharge opening 10, after which control unit 34, moves plunger 19 downwards over distance D in second direction Y by means of lifting mechanism 20, which results in dispensing a predetermined amount of glue from discharge opening 10 of discharge nozzle 8 onto brick slip B. Preferably, the surface of brick slip B is measured before passing brick slip B towards discharge opening 10.

In an example of method 1000 according to the invention (see FIG. 4), method 1000 comprises providing 1002 a gluing device according to the invention or a system according to the invention and providing a number of stone slips or brick slips B as a supply to be glued to a base surface. Method 1000 further comprises positioning 1004 a surface of a brick slip B of the number of brick slips B underneath the discharge nozzle. After the step of positioning 1004, the step of discharging 1006 glue on a surface of brick slip B is performed, which is followed by the step of gluing 1008 brick slip B to the base surface.

Method 1000 may optionally also includes several other method steps. Method 1000 may for example also comprise the step of detecting 1010 by the detection module an amount of glue on brick slip B, which is performed after the step of discharging 1006 on the surface of brick slip B has been performed. Subsequently, the optional step of detecting 1010 is followed by the step of comparing 1012, by the control unit, the amount of glue on brick slip B with a set point, which also is an amount of glue. This amount may for example be a quantity, a thickness, a distribution or a combination of one or more thereof. The step of comparing 1012 can be followed by either the step of gluing 1008 the brick slip B to the base surface if the amount of glue meets or exceeds the set point or the step of refurbishing 1014 the brick slip B if the amount of glue does not meet the set point. In the latter case, the refurbished brick slip B must be refurbished by scraping of the glue and regluing the brickwork slip B.

Method 1000 may also comprise other optional steps, which are preferably performed before, during or, at the latest, directly after the step of positioning 1004 of brick slip B. These optional steps comprise the step of measuring 1016 a surface size and/or thickness and/or shape of a brick slip B to be glued, and calculating 1018, by the control unit, the amount of glue to be dispensed based on the measured surface size and/or thickness and/or shape of a brick slip to be glued. These steps are following by discharging 1006*a* or dispensing 1006*a* the calculated amount of glue.

The present invention is by no means limited to the above described preferred embodiments thereof. The rights sought are defined by the following claims within the scope of which many modifications can be envisaged.

The invention claimed is:

1. Brick slip and/or stone slip gluing device comprising:
a support;
a glue container that extends from a first end to a second end, wherein the glue container is operatively and removably connected to the support and is configured to hold cement-based glue;
a discharge nozzle that is operatively connected to the first end of the glue container and that is provided with a discharge opening;
a plunger that, during use of the device, is positioned in the glue container and that is provided with a drive side facing the first end of the glue container and a press side facing the second end of the glue container, and wherein the plunger is operatively connected to the support;
a servo that is operatively connected to the plunger and that is configured to apply pressure on the plunger;
a control unit that is configured to receive pressure information from the servo and that is further configured to calculate, by comparing the pressure value with predetermined pressure set point, whether the glue or glue container needs to be replaced; and
wherein the plunger and the container are connected to the support and wherein one of the plunger and the container is moveably connected to the support with respect to the other of the plunger and the container, such that the plunger and the container are moveable relative to each other.

2. Brick slip and/or stone slip gluing device according to claim 1, wherein a discharge opening of the discharge nozzle is an elongated slit-shaped discharge opening.

3. Brick slip and/or stone slip gluing device claim 1, wherein the discharge nozzle is removably connected to the glue container, and is a replaceable and/or exchangeable discharge nozzle.

4. Brick slip and/or stone slip gluing device according to claim 1, wherein the control unit is further configured to, based on a time reference point, determine an operational time period of a glue container and to prevent discharge of cement-based glue after the determined operational time period has lapsed.

5. Brick slip and/or stone slip gluing device according to claim 1, wherein the plunger is moveably connected to the support, and wherein the device comprises a plunger lifting mechanism that is configured to move the plunger with respect to the container.

6. Brick slip and/or stone slip gluing device according to claim 1, further comprising a detection module that is positioned near or adjacent to the discharge nozzle.

7. Brick slip and/or stone slip gluing device according to claim 6, wherein the detection module comprises a camera, a sensor, a laser, an infra-red beam, or a combination thereof.

8. Brick slip and/or stone slip gluing device according to claim 1, wherein the glue container and/or the plunger is removably connected to the support, and wherein the glue container is an exchangeable glue container.

9. Brick slip and/or stone slip gluing device according to claim 1, wherein the plunger and/or the glue container comprises an air release channel.

10. Brick slip and/or stone slip gluing device according to claim 1, wherein the control unit is further configured to control the relative movement between the plunger and the glue container to dispense a predetermined amount of glue through the discharge nozzle.

11. Brick slip and/or stone slip gluing device according to claim 10, wherein the control unit is additionally configured to control the relative movement between the plunger and the glue container based on measurement data from a detection module.

12. System for gluing brick slips and/or stone slips for brickwork veneer, the system comprising:
an input;
an output; and
at least one brick slip and/or stone slip gluing device according to claim 1 that is positioned between the input and the output.

13. Method for providing brick slips on a base surface, comprising the steps of:
providing a gluing device according to claim 1;
providing a number of brick slips to be glued;
positioning a surface of a brick slip to be glued underneath the discharge nozzle;
discharging cement-based glue on the surface of the brick slip; and
gluing the surface of the brick slip to a base surface.

14. Method according to claim 13, further comprising:
after the step of discharging glue on the surface, detecting, by the detection module, an amount of cement-based glue on the surface of the brick slip; and
comparing, by the control unit, the amount of cement-based glue with a set point,
wherein if the amount of cement-based glue meets or exceeds the set point, gluing the surface of the brick slip to a base surface, and
wherein if the amount of cement-based glue does not meet the set point, refurbishing the brick slip by removing the glue from the surface of the brick slip.

15. Method according to claim 13, further comprising:
measuring a surface size and/or thickness and/or shape of a brick slip to be glued;
calculating, by the control unit, the amount of cement-based glue to be dispensed based on the measured surface size and/or thickness and/or shape of a brick slip to be glued; and
dispensing the calculated amount of cement-based glue.

16. Method according to claim 13, further comprising:
determining, by a control unit and based on a time reference point, an operational time of a glue container; and
preventing discharge of cement-based glue after the predetermined operational time period has lapsed.

17. Method according to claim 13, further comprising:
after the step of discharging glue on the surface, detecting, by the detection module, an amount of cement-based glue on the surface of the brick slip; and
comparing, by the control unit, the amount of cement-based glue with a set point,
wherein if the amount of cement-based glue meets or exceeds the set point, gluing the brick slip with its surface to a base surface, and
wherein if the amount of cement-based glue does not meet the set point, refurbishing the brick slip by removing the cement-based glue from the brick slip.

* * * * *